United States Patent [19]

Nagaoka

[11] Patent Number: 4,616,274
[45] Date of Patent: Oct. 7, 1986

[54] TAPE END DETECTING DEVICE FOR EXTRACTABLE TAPE TYPE CASSETTE

[75] Inventor: Yoshimichi Nagaoka, Yokohama, Japan

[73] Assignee: Victor Company of Japan, Ltd., Yokohama, Japan

[21] Appl. No.: 469,972

[22] Filed: Feb. 25, 1983

[30] Foreign Application Priority Data

Mar. 1, 1982 [JP] Japan .................... 57-32041
Mar. 2, 1982 [JP] Japan .................. 57-29293[U]

[51] Int. Cl.⁴ .................... G11B 15/08; G11B 15/66
[52] U.S. Cl. .................... 360/71; 360/74.6; 360/85; 360/95; 360/132; 242/188
[58] Field of Search .................... 360/74.1, 74.5, 74.6, 360/85, 95, 132, 72.1, 69, 71, 93, 134; 250/561, 571; 242/57, 186, 188, 195

[56] References Cited

U.S. PATENT DOCUMENTS

| | | | |
|---|---|---|---|
| 3,497,157 | 2/1970 | Hanes et al. | 360/74.6 X |
| 3,614,453 | 10/1971 | Johnson | 360/74.6 X |
| 3,792,491 | 2/1974 | Inaga | 360/85 |
| 3,861,619 | 1/1975 | Wolff | 360/74.6 X |
| 3,866,856 | 2/1975 | Katoh | 360/74.6 X |
| 3,898,695 | 8/1975 | Yabu et al. | 360/74.6 X |
| 3,912,205 | 10/1975 | Koyama | 360/74.6 X |
| 3,925,817 | 12/1975 | Althuber et al. | 360/74.6 |
| 4,057,839 | 11/1977 | Banks | 360/74.6 X |
| 4,091,168 | 5/1978 | Kawamata | 360/85 |
| 4,091,426 | 5/1978 | Umeda | 360/74.6 |
| 4,185,306 | 1/1980 | Dudley | 360/74.6 |

FOREIGN PATENT DOCUMENTS

| | | | |
|---|---|---|---|
| 1254377 | 11/1967 | Fed. Rep. of Germany | 360/74.6 |
| 2058744 | 6/1972 | Fed. Rep. of Germany. | |
| 2216896 | 10/1972 | Fed. Rep. of Germany. | |
| 3043041 | 9/1981 | Fed. Rep. of Germany. | |
| 2098778 | 3/1972 | France. | |
| 2286468 | 4/1976 | France. | |
| 55-52546 | 4/1980 | Japan | 360/74.6 |
| 1341896 | 12/1973 | United Kingdom | 360/93 |

Primary Examiner—Raymond F. Cardillo
Assistant Examiner—Steven R. Garland
Attorney, Agent, or Firm—Louis Bernat

[57] ABSTRACT

A tape end detecting device detects a tape end in a tape cassette comprising a cassette case. The cassette case comprises a first reel having a first reel hub and a second reel having a second reel hub, an opaque tape having first and second transparent leaders integrally fixed to the opposite ends thereof, wherein the tape is connected at the opposite ends of the leaders to the first and second reel hubs. The tape end detecting device comprises at least one light-emitting element, and at least one light-receiving element. The light-emitting element and the light-receiving element are arranged outside a tape cassette loading space for loading the tape cassette so that a traveling path of a light beam connecting the light-emitting element and the light-receiving element intersect the tape and the first or second leader. The light-receiving element receives the light beam which passes through the first or second leader when the first or second leader assumes a position intersecting the traveling path of the light beam connecting the light-emitting element and the light-receiving element, to detect a tape end at the first or second reel.

5 Claims, 25 Drawing Figures

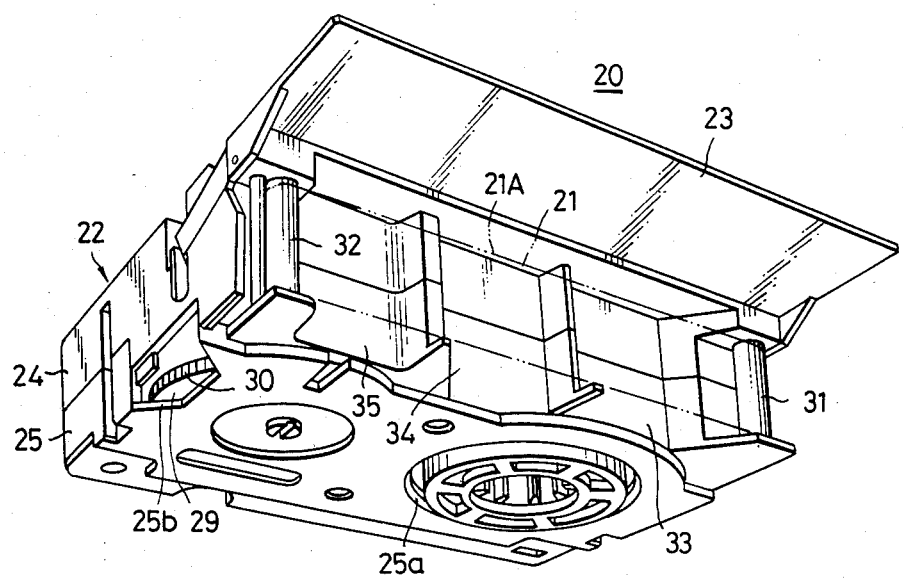
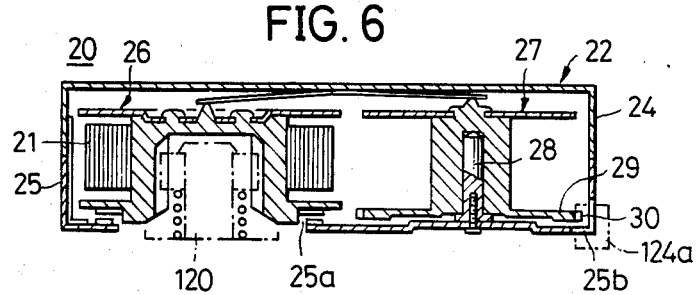
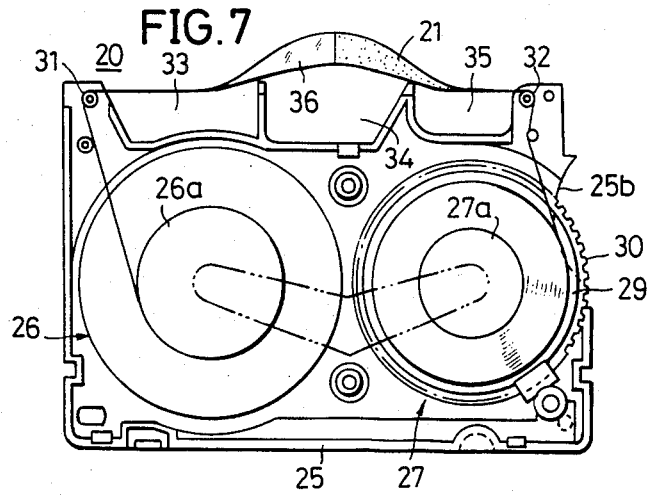

TAPE END DETECTING DEVICE FOR EXTRACTABLE TAPE TYPE CASSETTE

BACKGROUND OF THE INVENTION

The present invention generally relates to tape end detecting devices for detecting the ends of a cassette tape, and more particularly to a device for detecting a tape-end when the entire cassette tape within the tape cassette is taken up by a take-up reel or when the tape on a supply reel cannot travel further.

Conventionally, as a tape end detecting device for detecting that the entire tape within the tape cassette is taken up by the take-up reel or that the tape on the supply reel cannot travel further, there was a device comprising a light-emitting element which projects within a space within a recordind and/or reproducing apparatus for loading the tape cassette, and a light-receiving element provided beside the tape cassette loading space. In this conventional tape end detecting device, the light-emitting element relatively enters within the loaded tape cassette. Accordingly, it was necessary to provide space in the tape cassette for allowing the light-emitting element to enter within the tape cassette, in addition to the space required for accommodating the tape. Therefore, this need to provide additional space in the tape cassette for the light-emitting element caused problems in downsizing the tape cassette.

SUMMARY OF THE INVENTION

Accordingly, it is a general object of the present invention to provide a novel and useful tape end detecting device for a cassette tape, in which the above described problems have been overcome.

Another and more specific object of the present invention is to provide a tape end detecting device for a cassette tape, in which a light-emitting element and a light-receiving element are both arranged and provided at positions three-dimensionally separated from a cassette loading space within a recording and/or reproducing apparatus. According to the device of the present invention, there is no need to provide a space in the tape cassette for allowing the light-emitting element to enter within the tape cassette, and it becomes possible to sufficiently downsize the tape cassette.

Still another object of the present invention is to provide a tape end detecting device comprising light-emitting and light-receiving elements which are arranged and provided at positions separated from the tape cassette loading space within the recording and/or reproducing apparatus, in which a timing operation with which the tape end detecting device starts to operate is determined in relation to a tape loading operation of the recording and/or reproducing apparatus so that the tape end detecting device operates after the tape loading operation of the recording and/or reproducing apparatus is started and the tape loading operation advances to a stage prior to a stage where the tape drawn out of the tape cassette makes sliding contact with a guide drum. According to the device of the present invention, it becomes possible to position the light-emitting and light-receiving elements in front of the tape cassette in the plan view.

Other objects and further features of the present invention will be apparent from the following detailed description when read in conjunction with the accompanying drawings.

BRIEF DESCRIPTION OF THE DRAWINGS

FIG. 5 is a perspective view from below, showing the miniature type tape cassette shown in FIG. 4 with the lid open;

FIG. 6 is a diagram showing the miniature type tape cassette in vertical cross section along a line VI—VI in FIG. 4;

FIG. 7 is a plan view showing the miniature type tape cassette with the upper half removed, in a state where the trailer tape is drawn out of the tape cassette;

DETAILED DESCRIPTION

Figure 1:
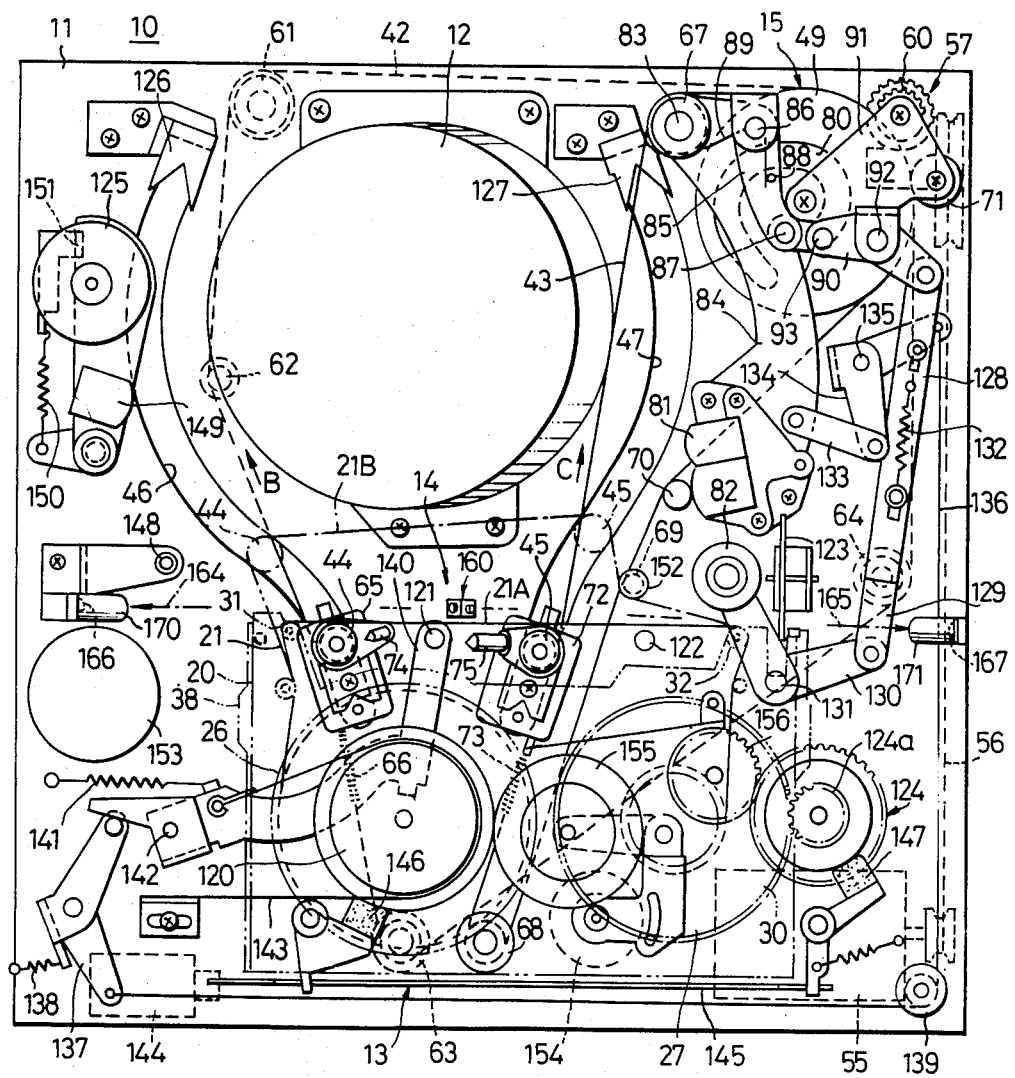
FIG. 1 is a plan view showing an embodiment of a tape end detecting device according to the present invention together with an automatic loading type recording and/reproducing apparatus applied with this embodiment of the tape end detecting device, in a state before the tape is loaded.
Figure 2:
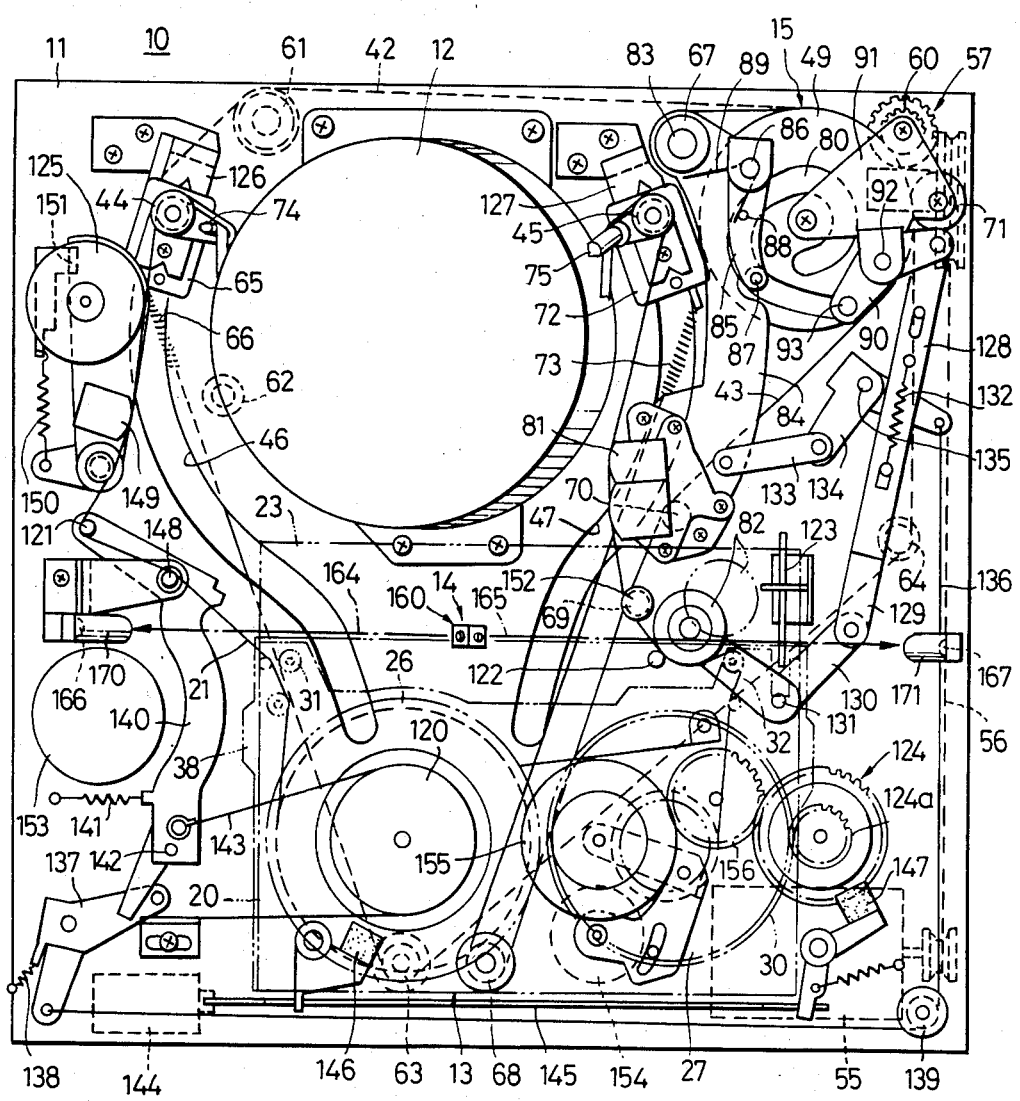
FIG. 2 is a plan view showing the apparatus shown in FIG. 1 in a recording or reproducing mode after the tape loading operation is completed.

In FIGS. 1 and 2, a recording and/or reproducing apparatus 10 applied with a tape end detecting device according to the present invention, is directly loaded with a tape cassette which is smaller than a standard type tape cassette. The apparatus 10 is constructed substantially by providing a guide drum 12, a cassette loading part 13, and a tape end detecting device 14 on a chassis 11, and providing a tape loading mechanism 15 shown in FIG. 3 and the like underneath the chassis 11.

First, a miniature type tape cassette 20 having a construction which will be described hereinafter, is loaded into a predetermined position within the apparatus 10. As shown in FIGS. 4 through 8, the miniature type tape cassette 20 consists of a cassette case 22 accommodating a magnetic tape 21, and a lid 23 provided at the front of the cassette case 22 in a state where the lid 23 is free to open and close. The cassette case 22 is assembled of an upper half 24 and a lower half 25. The lid 23 pivots between a closed position indicated in FIG. 4 and an open position indicated in FIG. 5, and is held at the above two positions with a detent action.

Figure 8:
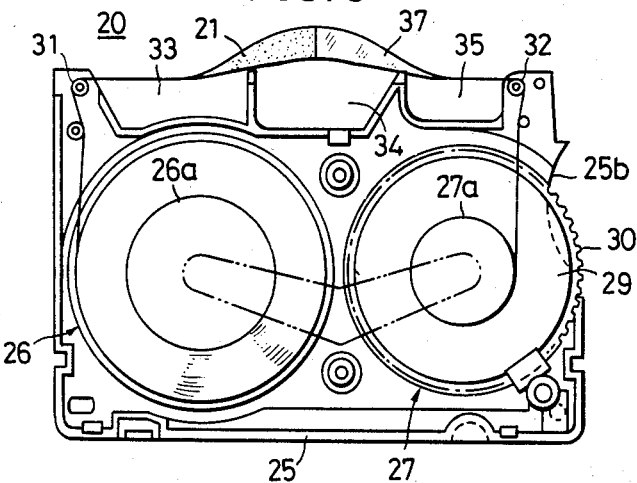
FIG. 8 is a plan view similar to FIG. 7 showing a state where the leader tape is drawn out of the tape cassette.
Figure 9:
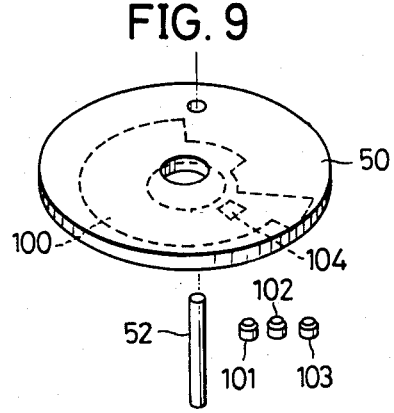
FIG. 9 is a perspective view showing a rotary angle detecting disc in FIG. 3 in correspondence with a light-detecting element.

A supply reel 26 and a take-up reel 27 are provided side by side inside the cassette case 22, as shown in FIGS. 6 through 8. The supply reel 26 is formed with a reel driving shaft inserting part, and this reel driving shaft inserting part is provided in a state where the reel driving shaft inserting part is exposed through an opening 25a in the lower half 25. The take-up reel 27 is fitted over a fixed shaft 28 which is embeddedly provided on the lower half 25, in a freely rotatable manner. A gear part 30 is formed at the peripheral part of a lower flange of the take-up reel 27. A part of the gear part 30 is exposed through a window 25b which is extending from the side to bottom of the lower half 25.

The magnetic tape 21 is guided by guide poles 32 and 31 provided on the right and left sides, and forms a tape path 21A along the front of the cassette case 22.

Cutouts 33, 34, and 35 are formed at the front of the cassette case 22. An opening through which a light-emitting element for detecting the tape end can enter, is not provided in the cassette case 22. Hence, the supply and take-up reels 26 and 27 are arranged sufficiently close to each other, without providing a gap therebetween for the above opening. As a result, the size of the miniature type tape cassette 20 is considerably smaller.

As shown in FIGS. 7 and 8, one end of the magnetic tape 21 is connected to the outer end of a transparent trailer tape 36 which is fixed at its inner end to a reel hub 26a of the supply reel 26. The other end of the magnetic tape 21 is connected to the outer end of a transparent leader tape 37 which is fixed at its inner end to a reel hub 27a of the take-up reel 27.

As shown in FIGS. 1 and 2, the tape cassette 20 is inserted within a cassette housing 38, and loaded into the cassette loading part 13.

Next, description will be given with respect to the tape loading mechanism and mechanisms related to the tape loading mechanism, by referring to FIGS. 3, and 9 through 14.

Figure 3:
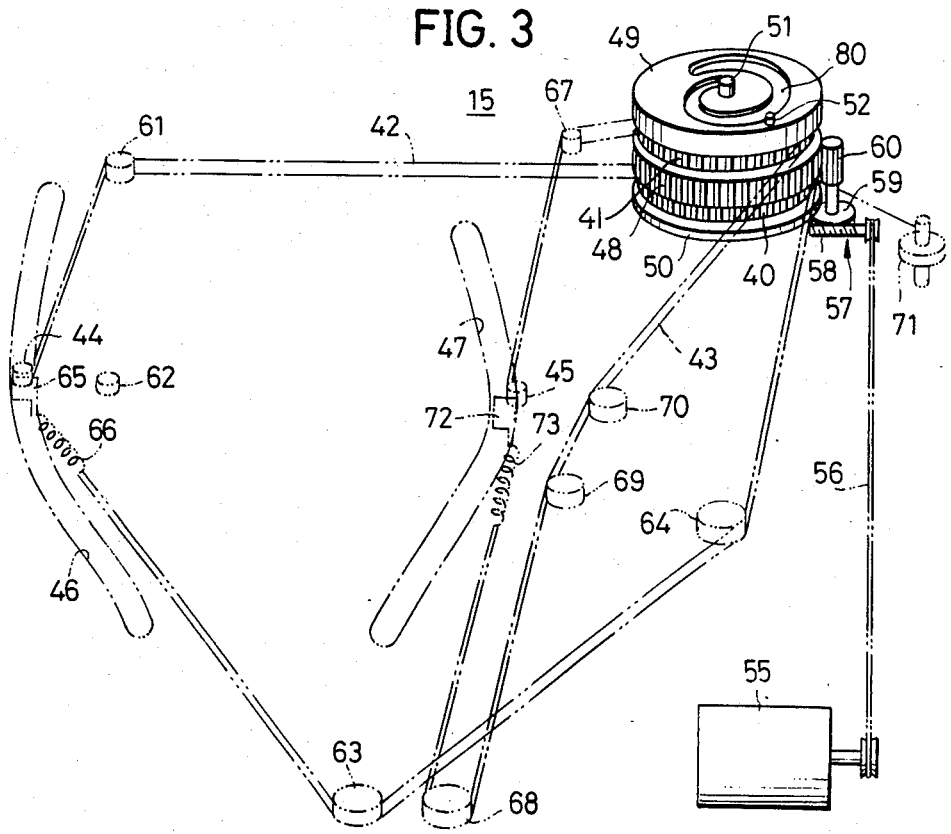
FIG. 3 is a perspective view showing a tape loading mechanism within the apparatus shown in FIG. 1.
Figure 4:
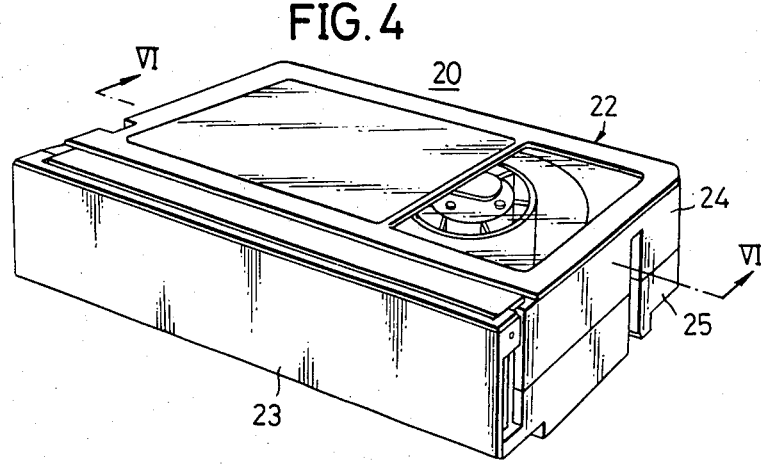
FIG. 4 is a perspective view from above, showing a miniature type tape cassette which may be applied to the apparatus shown in FIG. 1.

The tape loading mechanism 15 in the apparatus shown in FIGS. 1 and 2, is shown in FIG. 3. Timing gears 40 and 41 respectively rotate to drive timing belts 42 and 43 in the tape loading mechanism 15. When the timing belts 42 and 43 are driven to travel, loading poles 44 and 45 respectively move from original positions indicated in FIG. 1 to loading completed positions indicated in FIG. 2, along guide grooves 46 and 47.

The timing gear 40 is sandwiched between a central main gear 48 and a lowermost rotary angle detecting disc 50, and the timing gear 41 is sandwiched between the main gear 48 and an uppermost cam disc 49. The timing gears 40 and 41 are rotatably fitted over a shaft 51. The cam disc 49 and the rotary angle detecting disc 50 are connected to the main gear through a pin 52. Further, the timing gears 40 and 41 are connected to the pin 52 through coil springs (not shown). Accordingly, the cam disc 49, rotary angle detecting disc 50, and timing gears 40 and 41 can rotate substantially unitarily with the main gear 48. These discs 49 and 50, and gears 40, 41, and 48 are rotated by a loading motor 55 through a belt 56 and a gear mechanism 57 for reducing the rotational speed. Hence, the timing gears 40 and 41 are rotated clockwise by approximately 360° upon loading of the tape, and rotated counterclockwise by approximately 360° upon unloading of the tape. The gear mechanism 57 comprises a worm 58, a worm gear 59, and a gear 60 which meshes with the main gear 48.

The timing belt 42 is extended along the timing gear 40 and gears 61, 62, 63, and 64. One end of the timing belt 42 is directly connected to a support 65, and the other end of the timing belt 42 is connected to the same support 65 through a coil spring 66, to form a loop below the chassis 11. On the other hand, the other timing belt 43 is extended along the timing gear 41, gears 67 and 68, a guide roller 69, and a pole 70, in a state where the timing belt 43 is prevented from separating from the timing gear 41 by a roller 71. One end of the timing belt 43 is directly connected to a support 72, and the other end of the timing belt 43 is connected to the same support 72 through a coil spring 73, to form a loop above the chassis 11. The supports 65 and 72 are respectively fitted within the guide grooves 46 and 47, so that the supports 65 and 72 respectively are movable to slide along the guide grooves 46 and 47. The loading pole 44 and a slant pole 74 are embeddedly provided on the support 65. On the other hand, the loading pole 45 and a slant pole 75 are embeddedly provided on the support 72.

A cam groove 80 is formed in the cam disc 49. An audio and control head 81 and a pinch roller 82 are moved as will be described hereinafter, by the rotation of the above cam disc 49. Before the tape is loaded, the head 81 and the pinch roller 82 respectively are at positions indicated in FIG. 1. That is, the head 81 is at a position receded from the guide groove 47 so as not to interfere with the tape loading operation, and the pinch roller 82 is at a position remote from the cassette loading part.

Figure 11:
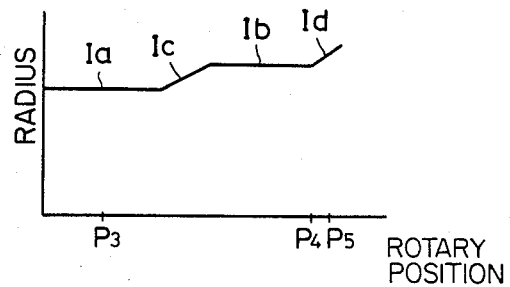
FIG. 11 is a graph showing a cam line of a cam groove in the cam disc shown in FIG. 10A.
Figure 10A:
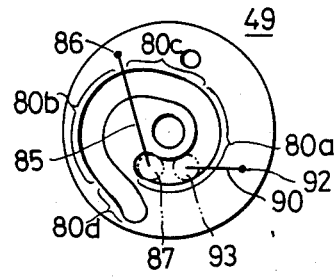
FIGS. 10A and 10B are plan views respectively showing a cam disc in a state before the tape is loaded and after the tape is loaded.
Figure 10B:
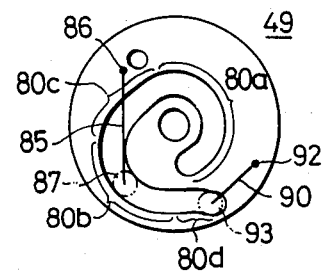

FIG. 10A shows a rotary state of the cam disc 49 before the tape is loaded, and FIG. 10B shows a rotary state of the cam disc 49 after the tape is loaded. FIG. 11 is a graph showing a cam line of the cam groove 80. As seen from FIG. 11, the cam groove 80 comprises an inner circular part 80a (Ia), an outer circular part 80b (Ib), a radius increasing part 80c (Ic) connecting the inner and outer circular parts 80a and 80b, and a radius increasing part 80d (Id) extending from the outer circular part 80b.

Figure 12:
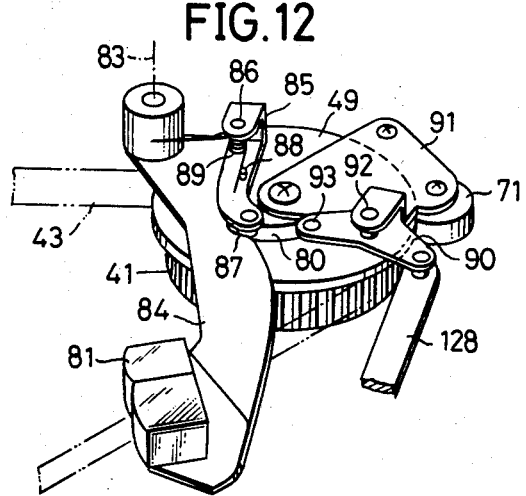
FIG. 12 is a perspective view showing an audio and control head support mechanism in the apparatus shown in FIG. 1.
Figure 13:
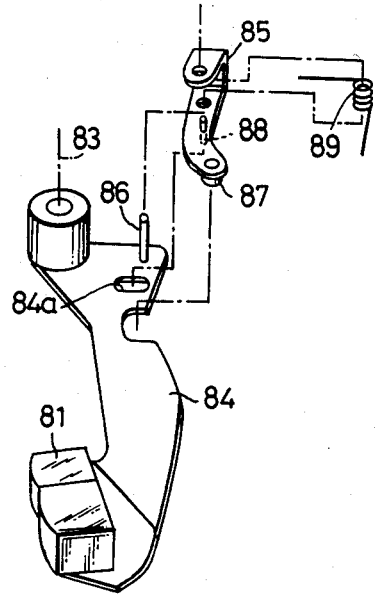
FIG. 13 is a perspective view showing a part of the mechanism shown in FIG. 12 in a disassembled state.

As shown in FIGS. 12 and 13, the head 81 is mounted at a tip end of a support arm 84 which is pivotally supported on a shaft 83. An assisting arm 85 is pivotally supported by a pin 86 on the support arm 84, and a hanging pin 87 is provided at a tip end of the assisting arm 85. The pin 87 fits within the cam groove 80. In addition, a pin 88 of the assisting arm 85 fits within a longitudinal hole 84a of the support arm 84. A torsion spring 89 is provided between the support arm 84 and the assisting arm 85, and the spring 89 urges the assisting arm 85 counterclockwise.

A bell crank lever 90 is pivotally supported by a pin 92 on a mounting plate 91, and a pin 93 of the lever 90 fits within the cam groove 80. The rotary angle detecting disc 50 shown in FIG. 3 comprises a reflecting plate 100 adhered at a bottom thereof, as shown in FIGS. 9 through 14. Three light-detecting elements 101, 102, and 103 are fixed onto a base opposing the reflecting plate 100. Each light-detecting element comprises a light-emitting element and a light-receiving element arranged adjacent to each other and formed as a unit. The reflecting plate 100 and each of the light-detecting elements 101 through 103 cooperate, to detect the rotary angular position of the detecting disc 50, that is, the rotary angular positions of the cam disc 80 and the timing gears 40 and 41. The elements 101 through 103 are arrranged linearly along a radial direction of the detecting disc 50, and respectively scan the bottom surface of the detecting disc 50 along tracks T1, T2, and T3 shown in FIG. 14 upon rotation of the detecting disc 50. When the elements 101 through 103 oppose the reflecting plate 100, the light-receiving elements of the elements 101 through 103 respectively receive light reflected by the reflecting plate 100, and these light-receiving elements produce an output level "1". On the other hand, the light-receiving elements produce an output level "0" when the elements 101 through 103 no longer oppose the reflecting plate 100 and there is no reflected light to the light-receiving elements from the relecting plate 100.

Figure 14:
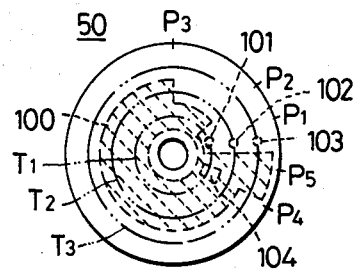
FIG. 14 is a plan view showing the rotary angle detecting disc shown in FIG. 9 in a rotary position before the tape loading operation is carried out, in correspondence with the light-emitting and light-receiving elements.

FIG. 14 shows a rotary position of the detecting disc 50 before the tape is loaded. In FIG. 14, an unloading completed position (position before the tape is loaded) is indicated by P1, a position immediately before unloading is completed (position immediately before starting of the tape loading operation) by P2, a position where tape end detecting device starts to operate by P3, a pause mode position by P4, and a tape loading completed position by P5. If these positions P1 through P5 are shown in terms of positions of the pin 87 fitted within the cam groove 80 of the cam disc 49 or positions of the pin 93 within the cam groove 80, a graph shown in FIG. 11 can be obtained. In FIG. 11, the position P3 indicates a position with respect to the pin 87, and the positions P4 and P5 indicate positions with respect to the pin 93.

The reflecting plate 100 has a predetermined shape, so that the reflecting plate 100 exists at the positions P2 through P5 excluding the position P4 on the track T1, at the position P3 through P5 on the track T2, and at the position P5 on the track T3, and comprises a through hole 104. The relationships between the rotary position of the rotary angle detecting disc 50 and the output levels of the elements 101 through 103 become as shown in the following table.

TABLE

| Rotary Element | Element 101 | Element 102 | Element 103 |
|---|---|---|---|
| P1 | 0 | 0 | 0 |
| P2 | 1 | 0 | 0 |
| P3 | 1 | 1 | 0 |
| P4 | 0 | 1 | 0 |
| P5 | 1 | 1 | 1 |

Figure 15:
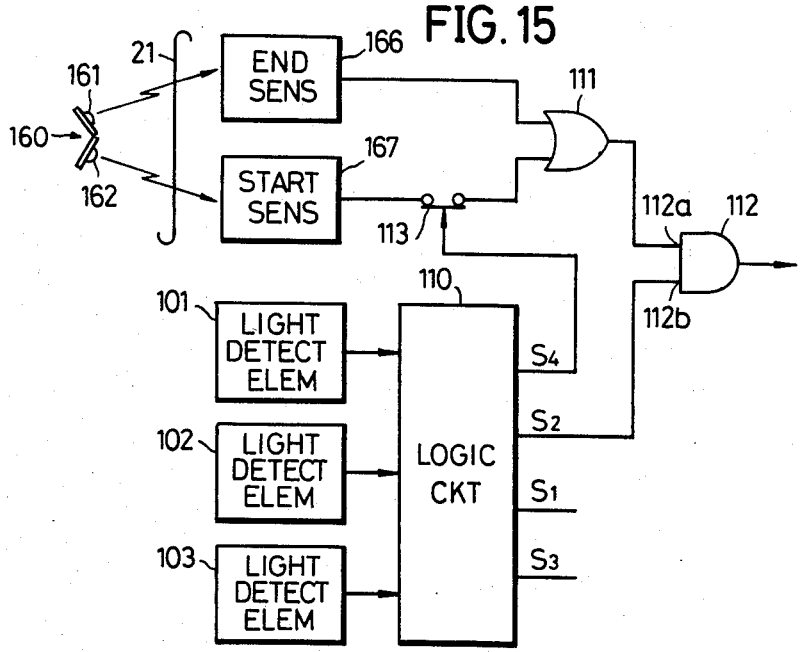
FIG. 15 is a block diagram showing a control system for controlling the operation of the recording and/or reproducing apparatus and the operation of the tape end detecting device.

The signals from each of the elements 101 through 103 are applied to a logic circuit 110 shown in FIG. 15. The logic circuit 110 produces an unloading completion signal S1 when the signals from the elements 101 through 103 are [000], a tape end detecting operation signal S2 when the signals are [110], [010], or [111], a pause signal S3 when the signals are [010], and a tape loading operation completion signal S4 when the signals are [111]. The operation of the recording and/or reproducing apparatus 10 is controlled according to the signals S1 through S4.

Next, description will be given with respect to the operation of the recording and/or reproducing apparatus 10.

As shown in FIG. 1, the tape cassette 20 is inserted into the cassette housing 38 from the side of the lid 23. Then, the tape cassette 20 is brought downwards together with the housing 38, and is loaded into the cassette loading part 13. In this state, a supply reel driving shaft 120 engages with the supply reel 26. Moreover, the loading pole 44, the slant pole 74, and a tension pole 121 respectively enter within the cutout 33, the loading pole 45 and the slant pole 75 respectively enter within the cutout 34, and a capstan 122 relatively enters within the cutout 35. Furthermore, an engaging member 123 engages with the lid 23 to open the lid 23 as shown in FIG. 5, accompanied by the downward movement of the tape cassette 20. In addition, the gear part 30 of the take-up reel 27 meshes with a small-diameter gear 124a of a tape take-up gear 124.

When a recording or reproducing operation is then carried out, the motor 55 is started, and the timing gears 40 and 41, the cam disc 49, and the rotary angle detecting disc 50 rotate clockwise. The timing belts 42 and 43 respectively travel in the directions of arrows B and C due to the rotation of the timing gears 40 and 41, and the supports 65 and 72 respectively move along the guide grooves 46 and 47. At this point, the poles 44 and 45 intercept and engage with the magnetic tape 21, to draw the magnetic tape 21 out of the tape cassette 20. The support 65 moves pushing an impedance roller 125 away, and the loading pole 44 is finally pushed against and held by a stopper 126. The support 72 moves passing in front of the audio and control head 81 which is at the receded position, and the loading pole 45 is finally pushed against and held by a stopper 127.

After the loading pole 45 passes in front of the audio and control head 81, the pin 87 is guided by the cam groove 80 to move towards the outer periphery of the cam disc 49, by the rotation of the cam disc 49. Hence, the support arm 84 and the assisting arm 85 unitarily rotate clockwise, and the head 81 approaches the magnetic tape 21 which is drawn outside the tape cassette 20, to finally make contact with the magnetic tape 21. As shown in FIG. 2, the assisting arm 85 rotates independently of the support arm 84 at the final stage, and the support arm 84 is urged clockwise by the force of the spring 89. Accordingly, a stopper (not shown) at the lower surface of the support arm 84 pushes against the pole 70 on the chassis 11, to position the head 81 at a predetermined position.

Further, by the rotation of the cam disc 49, the pin 93 of the bell crank lever 90 is guided by the cam groove 80 to rotate the lever 90 counterclockwise about the pin 92 as shown in FIG. 2. Moreover, a pinch roller support arm 130 is rotated counterclockwise about a shaft 131 through connection levers 128 and 129, and the pinch roller 82 pushes against the capstan 122. The pushing force of the pinch roller 82 with respect to the capstan 122 is produced by a force exerted by a coil spring 132 provided between the levers 128 and 129.

According to the rotation of the support arm 84, an L-shaped lever 134 rotates about a shaft 135 through a lever 133. Thus, a wire 136 is loosened, and an L-shaped lever 137 is rotated clockwise by a spring 138. The wire 136 is guided by a guide roller 139, and is provided along the peripheral edge of the apparatus in an L-shape. The levers 134 and 137 are connected by this wire 136. When the lever 137 rotates, a tension arm 140 rotates counterclockwise about a shaft 142 due to a spring 141, and the tension pole 121 reaches its operating position. In this state, tension is introduced in a brake band 143. In addition, a plunger 144 is actuated, and a slide plate 145 moves leftwards in FIG. 2. As a result, brake shoes 146 and 147 respectively separate from the supply reel driving shaft 120 and the tape take-up gear 124, to cancel the braking action.

Therefore, the recording and/or reproducing apparatus 10 assumes a state shown in FIG. 2. In this state, the magnetic tape 21 which is drawn out from the supply reel 26 makes contact with the impedance roller 125, after making contact with a guide pole 148, the tension pole 121, and a full-width erasing head 149. The impedance roller 125 and the full-width erasing head 149 are held in position at predetermined positions by a coil spring 150 and a stopper pin 151. The magnetic tape 21 further makes contact with the cylindrical surface of the guide drum 12 having rotary video heads, in a spiral manner, between the poles 74 and 75. While the magnetic tape 21 makes contact with and travels with respect to the guide drum 12, a video signal is recorded onto or reproduced from the magnetic tape 21 by the rotary video heads.

After making contact with the guide drum 12, the magnetic tape 21 makes contact with the audio and control head 81, and is guided by a guide pole 152. Hence, the magnetic tape 21 is driven in a state pinched between the pinch roller 89 and the capstan 122, and enters within the tape cassette 20 to be taken up by the take-up reel 27.

The capstan 122 is rotated by a capstan motor 153. Moreover, due to the clockwise rotation of a motor 154, an idler 155 moves and pushes against an intermediate gear 156. Thus, the motor 154 rotates the take-up reel 27 through the idler 155, the intermediate gear 156, and the gear 124. As a result, the take-up reel 27 is rotated clockwise to take-up the magnetic tape 21.

When a pause operation is carried out during the recording or reproducing mode, the loading motor 55 rotates in a reverse direction. Thus, the cam disc 49 and the rotary angle detecting disc 50 undergo slight counterclockwise angular rotation independently of the timing gears 40 and 41. The motor 55 stops rotating at a point in time when the pause signal S3 is produced from the logic circuit 110. The pinch roller 82 separates from the capstan 122 as indicated by a two-dot chain line in FIG. 2 due to the rotation of the can disc 49, and the apparatus 10 accordingly assumes the pause mode.

On the other hand, when a stop operation is carried out during the recording or reproducing mode, the loading motor 55 rotates in the reverse direction, and each of the mechanisms which operated during the tape loading operation then operates with a reverse sequence in an opposite direction to carry out a tape unloading operation. Thus, the magnetic tape 21 which is drawn outside the tape cassette 20 is taken up by the take-up reel 27 and becomes accommodated within the tape cassette 20. The loading motor 55 stops rotating at a point in time when the unloading completion signal S1 is produced from the logic circuit 110.

During a tape rewinding mode, the motor 154 rotates counterclockwise, and the idler 155 makes contact with the supply reel driving shaft 120. In this state, the motor 154 rotates the supply reel driving shaft 120.

Figure 17:
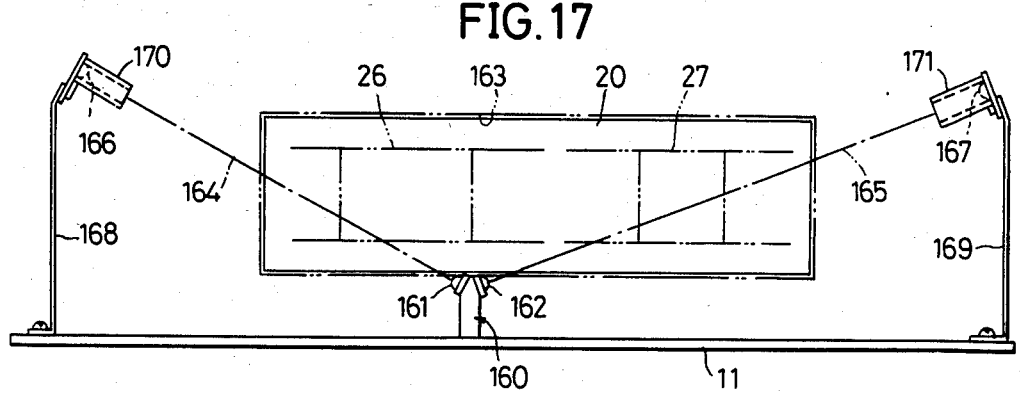
Figure 18:
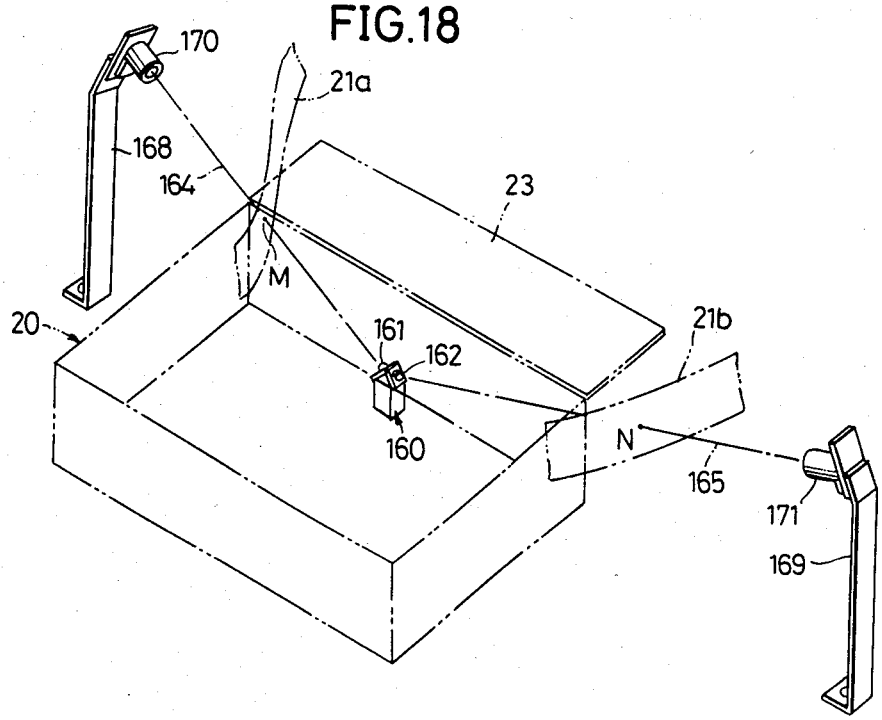
FIG. 18 is a perspective view showing the tape end detecting device.

Next, description will be given with respect to the tape end detecting device 14 which constitutes an essential part of the present invention, by referring to FIGS. 16 through 18.

A light-emitting element assembly 160 comprises a pair of light-emitting elements (photodiodes) 161 and 162 at a top part thereof, and is fixed to the chassis 11. As shown in FIG. 16, the light-emitting element assembly 160 is positioned closer to the drum 12 and outside a rectangular parallelopiped space 163 (cassette loading part 13) provided for loading the tape cassette, in the plan view. Further, as shown in FIG. 17, the light-emitting element assembly 160 is positioned lower than the space 163 in the elevation. That is, the light-emitting element assembly 160 does not project within the space 163, and for this reason, there is no need to provide a space in the tape cassette 20 for receiving the light-emitting element assembly 160. As a result, the tape cassette 20 can be effectively downsized. In addition, the light-emitting element assembly 160 is located at a position lower than a height position along the lower edge of the tape 21 which is drawn out from the tape cassette 20. Therefore, the tape loading operation and the tape unloading operation may be carried without interference by the light-emitting element assembly 160.

The light-emitting elements 161 and 162 are mounted in inclined states so as to respectively emit light along directions which are substantially parallel to the front of the loaded tape cassette 20 and upwardly inclined towards both the respective directions. The mounting position of the light-emitting element 161 is such that a light beam 164 emitted from the light-emitting element 161 passes through a point M of a tape part 21a of the tape 21 which is drawn outside the tape cassette 20 from the supply reel 26, in an oblique manner with respect to the tape width direction. Similarly, mounting position of the light-emitting element 162 is such that a light beam 165 emitted from the light-emitting element 162 passes through a point N of a tape part 21b of the tape 21 which is drawn outside the tape cassette 20 from the take-up reel 27, in an oblique manner with respect to the tape width direction.

An end sensor (light-receiving element) 166 for detecting the trailer tape 36 and a start sensor (light-receiving element) 167 for detecting the leader tape 37, are respectively mounted onto support brackets 168 and 169 on the chassis 11. In the elevation shown in FIG. 17, the sensors 166 and 167 are respectively arranged at positions on the left and right above the space 163 so as to receive the respective incoming light beams. The end sensor 166 detects the light beam 164 emitted from the light-emitting element 161, and the start sensor 167 detects the light beam 165 emitted from the light-emitting element 162.

Cylinders 170 and 171 respectively fit over the sensors 166 and 167. By providing these cylinders 170 and 171, the sensors 166 and 167 are hardly affected by external light from outside the recording and/or reproducing apparatus 10, and the tape end detecting device 14 is prevented from carrying out erroneous operations. Because the cylinders 170 and 171 are mounted in a declining manner, the sensors 166 and 167 are effectively prevented from operating erroneously.

The light-emitting element assembly 160 and the sensors 166 and 167 are arranged and provided at positions so that the light beams 164 and 165 are interrupted by the loading poles 44 and 45 before the tape end detecting device 14 starts to operate. Furthermore, the light-emitting element 162 and the start sensor 167 are arranged and provided at positions so that the light beam 165 is not interrupted by the pinch roller 82 at the initial stage of the tape loading operation and during the pause mode.

Figure 16:
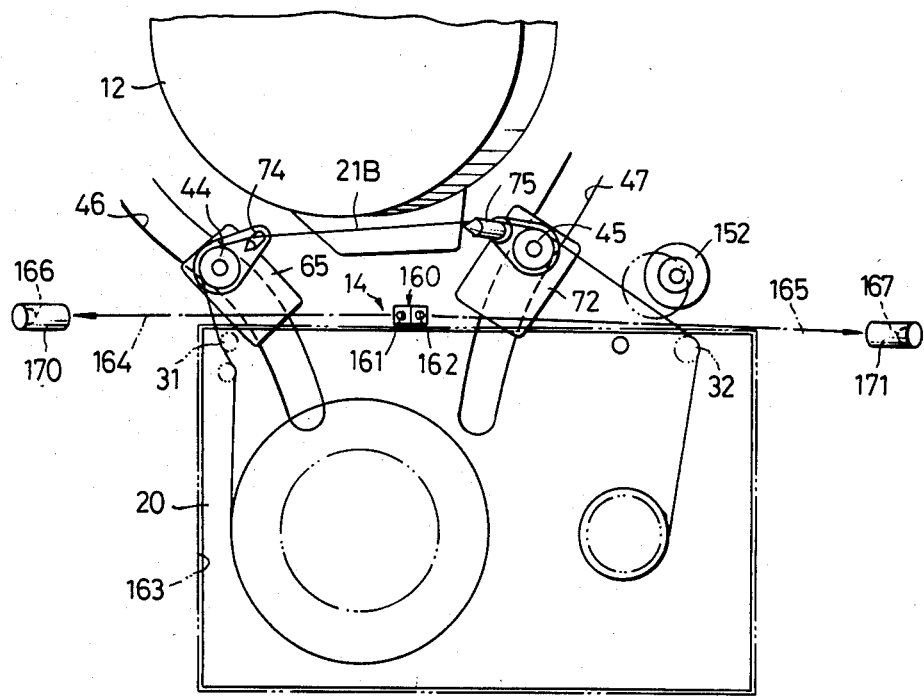
FIGS. 16 and 17 are a plan view and an elevation respectively showing the tape end detecting device, for indicating the positional relationship of the tape end detecting device with respect to the miniature type tape cassette loading space within the recording and/or reproducing apparatus.

In addition, the relationship between the position P3 shown in FIG. 14 and the tape loading mechanism is determined so that when the elements 101 through 103 detect the position P3, the tape loading operation advances to a stage indicated by a one-dot chain line in FIG. 1 and by a solid line in FIG. 16, the tape 21 does not make contact with the guide drum 12 and forms a tape path 21B separated from the guide drum 12.

Next, description will be given with respect to the operation of the tape end detecting device described heretofore.

In a state shown in FIG. 1 before the tape loading operation is started and where the tape cassette 20 is merely loaded into the recording and/or reproducing apparatus 10, the sensors 166 and 167 respectively receive light beams from the light-emitting elements 161 and 162, and assume states equivalent to those obtained when the sensors 166 and 167 detect the transparent trailer tape 36 and the leader tape 37. However, the outputs from the elements 101 through 103 are [000]. Hence, the logic circuit 110 shown in FIG. 15 produces the signal S1, but does not produce the signal S2. Accordingly, the high-level signals (level "1") from the sensors 166 and 167 pass through an OR-gate 111, and is applied to one input terminal 112a of an AND-gate 112. However, the signal level at the other input terminal 112b of the AND-gate 112 is low ("0"). For this reason, the output level of the ANd-gate 112 is low ("0"), which means that no unloading signal is produced. If the output level of the AND-gate 112 is high ("1"), this high-level output of the AND-gate 112 acts as an unloading signal to reverse the rotating direction of the loading motor 55. Therefore, the recording and/or reproducing apparatus 10 assumes a state equivalent to the state where the magnetic tape part is detected, instead of assuming the state equivalent to the state where the sensors 166 and 167 detect the trailer and leader tapes 36 and 37, and the tape loading operation can be started normally.

When the tape loading operation is started, the outputs from the elements 101 through 103 immediately become [100], however, the signal S2 is not produced from the logic circuit 110. Hence, the unloading signal is not produced from the AND-gate 112, that is, the output of the AND-gate 112 does not become high, and the tape loading operation advances. As a result, no problems are introduced because of the fact that the tape end detecting device 14 is provided outside the space 163 for loading the tape cassette 20.

As the tape loading operation advances and the loading poles 44 and 45 assume a state indicated by a one-dot chain line in FIG. 1 and FIG. 16 where the loading poles 44 and 45 slightly exceed the light beams 164 and 165 but do not reach the guide drum 12, the outputs from the elements 101 through 103 become [110]. Thus, the signal S2 is produced from the logic circuit 110, and the level at the input terminal 112b of the AND-gate 112 becomes high. Hence, the AND-gate 112 assumes a state where the AND-gate 112 can produce the unloading signal according to the signals from the sensors 166 and 167. Accordingly, the tape end detecting device starts to operate from this point, that is, after the tape loading operation is started.

When the magnetic tape 21 is drawn out from the tape cassette 20, the output levels of the sensors 166 and 167 respectively are low, and the level at the input terminal 112a of the AND-gate 112 is also low. Hence, the unloading signal is not produced from the AND-gate 112. As a result, the tape loading operation continues to advance, and the magnetic tape 21 is loaded as shown in FIG. 2.

On the other hand, if the trailer tape 36 and not the magnetic tape 21 is drawn outside the tape cassette 20 at this point, the end sensor 166 receives the light beam 164 which passes through the trailer tape 36 and produces a high-level output. Thus, the level at the input terminal 112a of the AND-gate 112 becomes high, and the AND-gate 112 produces an unloading signal. Therefore, the tape loading operation is immediately stopped to start an unloading operation, and the tape becomes accommodated within the tape cassette 20 by this unloading operation.

Further, if the leader tape 37 and not the magnetic tape 21 is drawn outside the tape cassette 20 at this point, the start sensor 167 receives the light beam 165 which passes through the leader tape 37 and produces a high-level output. Thus, the level at the input terminal 112a of the AND-gate 112 becomes high, and the AND-gate 112 produces an unloading signal. Therefore, the tape loading operation is immediately stopped to start an unloading operation.

Accordingly, it is possible to positively prevent an accident from happening, so that the joint between the magnetic tape 21 and the trailer tape 36 or the leader tape 37 does not make contact with the guide drum 12 to cause damage to the video heads due to unnecessary advancement of the tape loading operation. Moreover, after the unloading operation is completed, the recording and/or reproducing apparatus 10 automatically carries out a rewind operation if the end sensor 166 detects the light beam 164, and automatically carries out a fast-forward operation if the start sensor 167 receives the light beam 165. Hence, the tape within the tape cassette 21 assumes a wound state so that a succeeding tape loading operation will not stop halfway through the operation and the tape will become loaded to the completely loaded position.

When the tape loading operation is completed, the outputs from the elements 101 through 103 become [111], and the logic circuit 110 produces the signal S4 in addition to the signal S2. Thus, the AND-gate 112 assumes a state where the AND-gate 112 can produce the unloading signal according to the outputs from the sensors 166 and 167. During the recording or reproducing mode shown in FIG. 2, there is no need for the start sensor 167 to be operative. Hence, a normally closed switch 113 coupled to the output side of the start sensor 167 is opened by the signal S4 produced from the logic circuit 110, to disconnect the start sensor 167 from the rest of the circuit and reduce the power consumption. When the recording or reproducing operation is carried out up to the end of the tape, the end sensor 166 optically detects the trailer tape 36 and produces a high-level output. This high-level output of the end sensor 166 is supplied to the AND-gate 112 through the OR-gate 111, and the AND-gate 112 accordingly produces the unloading signal. As a result, the apparatus 10 stops the recording or reproducing operation to carry out a loading operation, and the apparatus 10 then assumes a stop mode.

During a pause mode, the outputs of the elements 101 through 103 become [010], and the logic circuit 110 produces the signals S2 and S3. Thus, the switch 113 is closed, and the start sensor 167 becomes connected to the rest of the circuit. Hence, if an operation such as a picture search operation in the reverse direction is carried out during the pause mode, for example, the leader tape 37 can be detected as the tape is rewound and the leader tape 37 is drawn outside the tape cassette 20, to stop the operation of the apparatus 10 at the point when the leader tape 37 is detected. Therefore, it is possible to positively prevent the joint between the leader tape 37 and the magnetic tape 21 from exceeding the loading pole 45 and making contact with the guide drum 12, when the entire leader tape 37 is drawn outside the tape cassette 21.

Next, description will be given with respect to other embodiments of a tape end detecting device according to the present invention, by referring to FIGS. 19 through 24. These embodiments are designed to satisfy the following conditions. That is, the light-emitting elements and light-receiving elements are arranged at different high positions so that: (1) the light-emitting elements and the light-receiving elements do not project within the space 163 for loading the tape cassette 20; (2) each of the light-emitting and light-receiving elements are located at positions so as not to interfere with the tape loading and unloading operations; and (3) traveling paths of light beams emitted from the light-emitting elements and reaching the light-receiving elements intersect the tape. In FIGS. 19 through 24, those parts which are essentially the same as those corresponding parts in FIGS. 16, 17, and 18 are designated by the same reference numerals.

Figure 19:
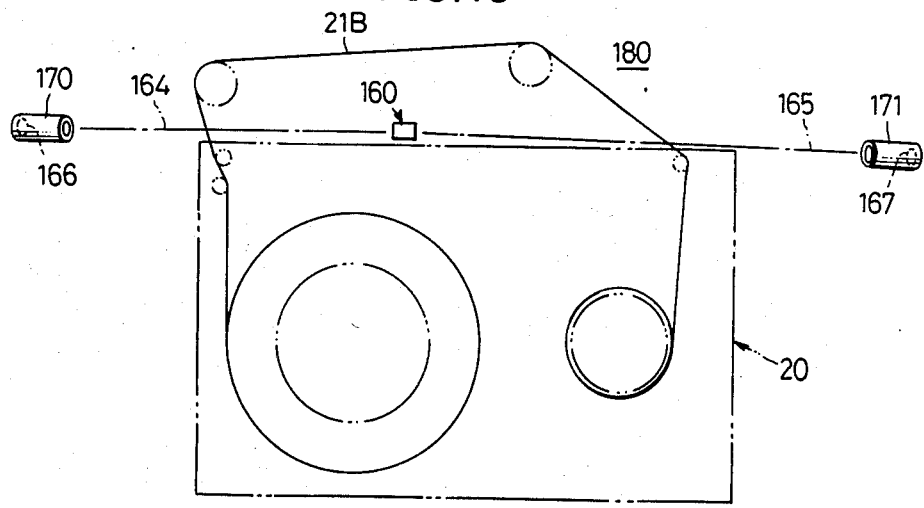
FIGS. 19 and 20 respectively are a plan view and an elevation generally showing a second embodiment of a tape end detecting device according to the present invention.
Figure 20:
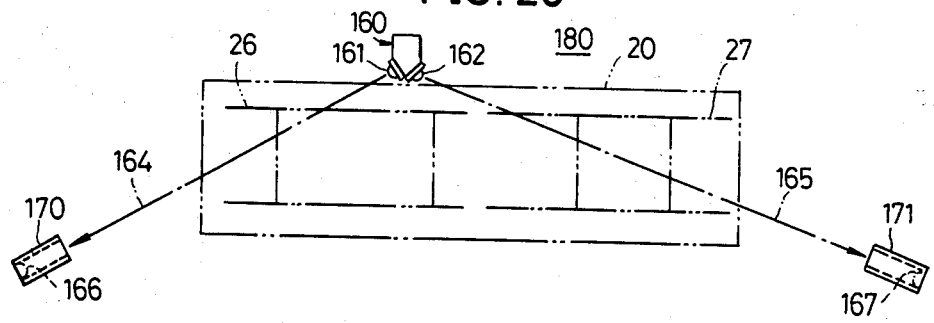

FIGS. 19 and 20 show a second embodiment of a tape end detecting device according to the present invention. A tape end detecting device 180 is designed so that the positional relationships between the light-emitting element assembly and the sensors are in reverse to the embodiment shown in FIG. 17. In this embodiment, the light-emitting element assembly 160 is arranged and provided above the tape cassette 20, and emits the light beams 164 and 165 which travel in a declining manner. The end sensor 166 and the start sensor 167 are provided below on both sides of the tape cassette 20. This device 180 operates similarly as the device shown in FIG. 17.

Figure 21:
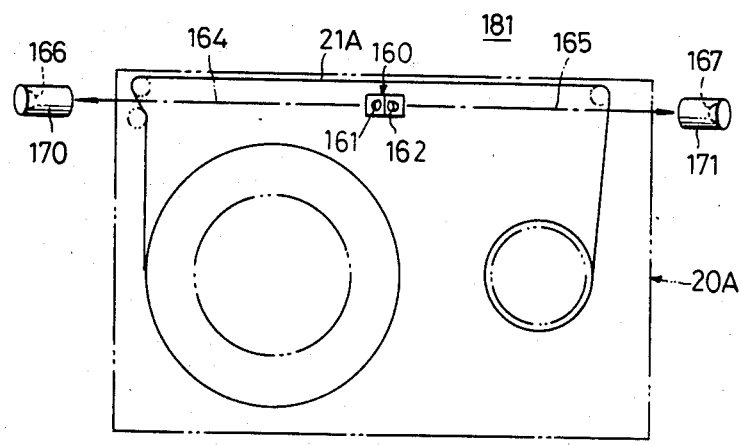
FIGS. 21 and 22 respectively are a plan view and an elevation generally showing a third embodiment of a tape end detecting device according to the present invention.
Figure 22:
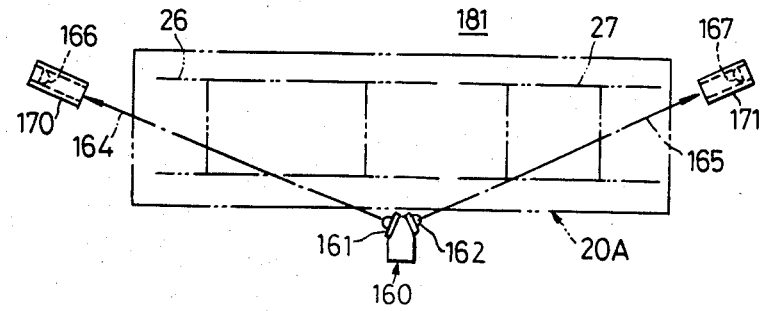

A third embodiment of a tape end detecting device according to the present invention is shown in FIGS. 21 and 22. In this embodiment, a tape end detecting device 181 is designed so that the light-emitting element assembly 160 is arranged and provided at a position under a tape cassette 20A at the front of the tape cassette 20A. The end sensor 166 and the start sensor 167 are arranged on both sides of the tape cassette 20A. The light beams 164 and 165 pass through the tape cassette 20A, and intersect the tape in an oblique manner along the tape width direction inside the tape cassette 20A. The parts of the tape cassette 20A where the light beams 164 and 165 pass through, are made transparent.

Figure 23:
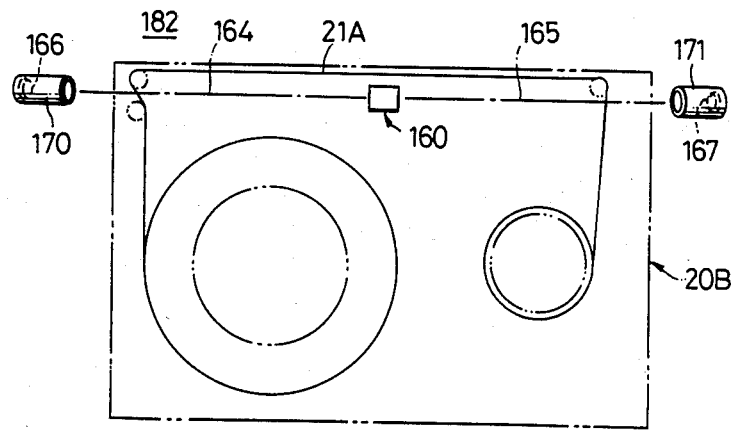
FIGS. 23 and 24 respectively are a plan view and an elevation generally showing a fourth embodiment of a tape end detecting device according to the present invention.
Figure 24:
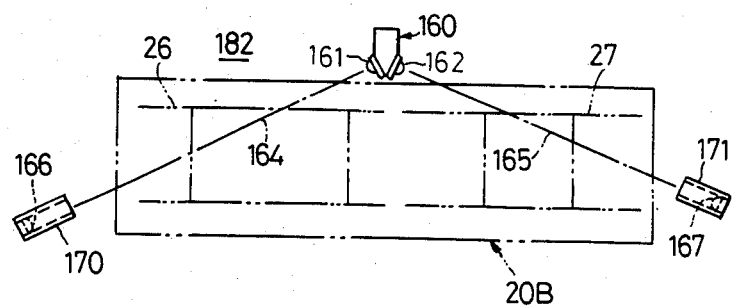

FIGS. 23 and 24 show a fourth embodiment of a tape end detecting device according to the present invention. In this embodiment, a tape end detecting device 182 is designed so that the positional relationships between the light-emitting element assembly and the sensors are in reverse to the third embodiment shown in FIGS. 21 and 22. That is, the light-emitting element assembly 160 is provided above a tape cassette 20B, and the sensors 166 and 167 are arranged below on both sides of the tape cassette 20B. The parts of the tape cassette 20B where the light beams 164 and 165 pass through, are made transparent.

The tape end detecting devices 181 and 182 both detect the end of tape within the tape cassette, as in the conventional tape end detecting devices. For this reason, the control circuit shown in FIG. 15 for controlling the timings of starting points of operations which is required in the first and second embodiments of the device according to the present invention, is not required in the devices 181 and 182. Accordingly, the construction of the devices 181 and 182 can be simplified.

In each of the embodiments described heretofore, the positions of the light-emitting elements and the light-receiving elements may of course be interchanged.

Further, the present invention is not limited to these embodiments, but various variations and modifications may be made without departing from the scope of the present invention.

What is claimed is:
1. A tape end detecting device for a tape cassette comprising a cassette case, said cassette case comprising a top surface, a bottom surface, a first reel having a first reel hub and a second reel having a second reel hub, a tape comprising an opaque tape, first and second transparent leaders integrally fixed to the opposite ends of said opaque tape, said tape being connected at the opposite ends of said leaders to said first and second reel hubs, said tape end detecting device being applied to a recording and/or reproducing apparatus comprising a tape cassette loading space for accommodating a tape cassette which is loaded, recording and/or reproducing means for recording and/or reproducing signals on and/or from said tape, and tape loading means for drawing out said tape from the loaded tape cassette in a direction substantially perpendicular to axes of said first and second reel hubs and for loading said tape into a predetermined tape path along said recording and/or reproducing means, said tape end detecting device comprising:
at least one light-emitting element; and
at least one light-receiving element, one of said light-emitting element and said light-receiving element being arranged at a first position within a closed area surrounded by a front of the loaded tape cassette and the tape which is drawn out of the loaded tape cassette by said loading means in a plan view from above the loaded tape cassette, said first position having a height which is either lower than the bottom surface of the cassette case of the loaded tape cassette or higher than the top surface of the cassette case of the loaded tape cassette in a view from a rear of the loaded tape cassette so that said one of said light-emitting element and said light-receiving element does not interfere with the operation of said tape loading means, the other of said light-emitting element and said light-receiving element being arranged at a second position which is located outside said closed area in the plan view from above the loaded tape cassette, said second position having such a height in the view from the rear of the loaded tape cassette that a straight optical path of a light beam emitted from said light-emitting element and reaching said light-receiving element intersects said tape obliquely with respect to a width direction of said tape, said light-receiving element receiving the light beam passing through said first or second leader when said first or second leader assumes a position intersecting the optical path of the light beam connecting said light-emitting element and said light-receiving element to detect a tape end at said first or second reel.

2. A tape end detecting device as claimed in claim 1 in which said tape end detecting device further comprises gating means responsive to said tape loading means for controlling said tape end detecting device to start its operation after said tape loading means operates and draws out a part of said tape outside said tape cassette.

3. A tape end detecting device as claimed in claim 2 in which said gating means comprises detecting means for detecting that said tape loading means carries out a loading operation to a position where said tape is ready to make contact with said recording and/or reproducing means, and means responsive to the detecting operation of said detecting means, for gating a signal responsive to a reception of the light beam of said light-receiving element.

4. A tape end detecting device as claimed in claim 1 which further comprises a cylinder fitted over said light-receiving element to project towards said light-emitting element.

5. A tape end detector for use in a tape cassette system having two reels comprising a cassette containing an elongated opaque tape having two ends said tape being wound on and transportable between said two reels, each of said end of said opaque tape terminating in a transparent leader, a recording and/or reproducing means for receiving said cassette, said recording and/or reproducing means having means for turning said reels and for drawing said tape out of a front of said cassette and for transporting said tape over a path extending from said front of said cassette and past at least one recording and/or reproducing head means, the path followed by said drawn out tape lying in a plane at least in front of said cassette from which said tape is drawn out whereby a clear space is required to draw out said tape from the front of said cassette, and optical sensor means comprising a light source means and a light detector means positioned outside the cassette itself and on opposite sides of said tape in said vicinity of said front of said cassette where said tape path lies in said plane, said light source means and said light detector means being respectively positioned above said tape on one side of said path and below said tape on the opposite side of said path so that an optical path between said light source means and said light detector means etends through said tape and at an acute angle with respect to the width of the tape, whereby neither said light source nor said light detector lies in a position in said plane and within said clear space which would interfer with either the loading/unloading of said cassette in said recording and/or reproducing means or the drawing out of said tape.

* * * * *